United States Patent
Palmer

[15] 3,699,434
[45] Oct. 17, 1972

[54] BANDWIDTH AND CENTER FREQUENCY TESTING USING PREDETERMINED AMPLITUDE POINTS

[72] Inventor: Douglas B. Palmer, Graham, N.C.
[73] Assignee: Western Electric Company Incorporated, New York, N.Y.
[22] Filed: Feb. 24, 1971
[21] Appl. No.: 118,386

[52] U.S. Cl. .................... 324/57 R, 324/81, 330/2
[51] Int. Cl. ............................................. G01r 27/00
[58] Field of Search ............. 324/57, 78 D, 81; 330/2

[56] References Cited

UNITED STATES PATENTS

| | | |
|---|---|---|
| 3,432,752 | 3/1969 | Frederickson et al. ...324/57 R |
| 2,405,597 | 8/1946 | Miller ...................... 324/78 D |

Primary Examiner—Stanley T. Krawczewicz
Attorney—W. M. Kain and W. L. Williamson

[57] ABSTRACT

A frequency responsive device, such as a tuned amplifier, filter, etc., is tested for center frequency and bandwidth. A decreasing sweep frequency signal is applied to the device and the output detected. A waveform analyzer produces a first pulse when the detected signal reaches a predetermined amplitude and a second pulse when the detected signal falls below the predetermined amplitude. The first and second pulses trigger or operate a counter which counts the cycles of sweep frequency signal for a predetermined duration in response to each pulse. The sum in the counter is indicative of the center frequency. The count after the first pulse is multiplied by 2 and added to the complement of the sum in the counter after the second pulse to produce a remainder which is multiplied by 2 to indicate the bandwidth.

7 Claims, 2 Drawing Figures

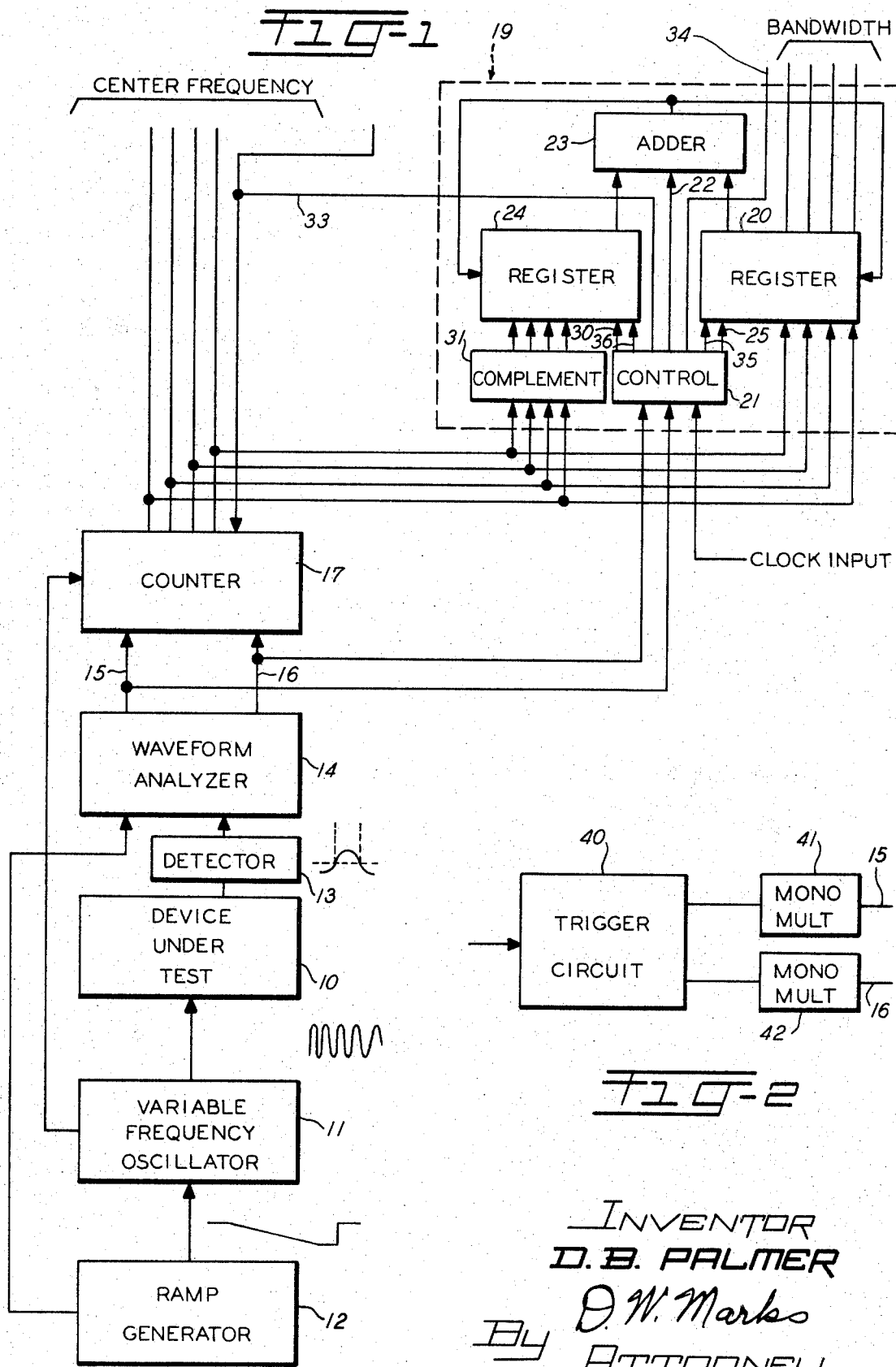

3,699,434

BANDWIDTH AND CENTER FREQUENCY TESTING USING PREDETERMINED AMPLITUDE POINTS

BACKGROUND OF THE INVENTION

1. Field of the Invention

Frequency responsive devices, such as tuned amplifiers, filters, etc., must be tested during their manufacture to determine that they have the correct frequency response. In particular, it is desirable to know their center of frequency response and their bandwidth.

2. Prior Art

Prior art testing circuits generally require manual operations and operator judgment to determine the frequency response of devices under test. One common circuit utilizes a sweep frequency signal which is applied to the unit under test and the detected output is applied to vertical deflection circuitry in an oscilloscope. The horizontal sweep of the oscilloscope is synchronized with the sweep of the sweep frequency signal. An operator then visually determines the bandwidth and frequency response of the unit under test.

SUMMARY OF THE INVENTION

An object of the invention is a new and improved method and apparatus for testing a frequency responsive device.

Another object of the invention is a method and apparatus for testing a frequency responsive device for frequencies at which the device has a predetermined characteristic.

A further object of the invention is a testing method and apparatus which automatically determines the center frequency and bandwidth of a frequency responsive device.

In accordance with these and other objects the present invention contemplates a method and apparatus for testing a frequency responsive device wherein a sweep frequency signal is applied to the input of the device. A detecting circuit senses a predetermined characteristic in the output of the device to produce an output pulse. The cycles of the input signal are counted in response to the output pulse for a predetermined duration to determine the frequency at which the device has the predetermined characteristic.

Additional features of the invention contemplate sensing a detected output of the frequency responsive device under test to produce a first pulse when the signal reaches a predetermined amplitude and a second pulse when the signal falls below the predetermined amplitude. The cycles of the input signal are counted for predetermined durations in response to the first and second pulses to determine the center frequency of the device under test. Further, the first frequency and the second frequency are applied to logic circuitry which computes the bandwidth of the device under test.

BRIEF DESCRIPTION OF THE DRAWINGS

FIG. 1 shows a block diagram of a circuit constructed in accordance with the invention; and FIG. 2 shows an alternate embodiment of a waveform analyzer included in FIG. 1.

DETAILED DESCRIPTION

Referring to FIG. 1, there is shown a unit under test 10 which is to be checked for its frequency response. The device may be a tuned amplifier, a tuned transformer, a bandwidth filter or any other device which produces varying magnitude of output signals when different frequencies are applied thereto. A sweep frequency signal is applied to the device under test 10 from a variable frequency oscillator 11 which is controlled by a ramp generator 12. In the embodiment shown in FIG. 1, the variable frequency oscillator 11 is swept from a high frequency to a low frequency. The output of the unit under test 10 is detected by a detector circuit 13 which produces a detected output signal which is indicative of the frequency response of the device under test.

The detected output from the detector 13 is applied to a waveform analyzer 14, such as Model 1000 sold by Automated Measurement Corporation of 638 University Avenue, Los Gatos, Calif. The waveform analyzer 14 is controlled by a synchronizing signal from the ramp generator 12 to sense when the output from the detector 13 reaches a predetermined amplitude, such as the 3db or half power level of the maximum amplitude. When the output reaches the predetermined amplitude, a first output pulse is produced on line 15 and when the signal again drops below the predetermined amplitude, a second output pulse is produced on line 16. The pulses produced on lines 15 and 16 trigger a counting circuit 17 for predetermined durations to cumulatively count the number of cycles of signal being produced by the variable frequency oscillator 11 at the times of the first and second pulses to indicate the center frequency response of the device 10. The predetermined durations for counting may be determined by the pulse width on lines 15 and 16 or by separate gating circuitry in the counting circuit 17 which is controlled by separately generated pulses having the predetermined durations.

For example, the counter may be triggered for 50 microseconds by the first and second pulses on lines 15 and 16. If the oscillator 11 is producing signals having a frequency of 100 and 90 megahertz at the respective first and second pulses, the counter 17 will read 95 to indicate 95 megahertz as the center frequency response of the device 10.

An alternate form of a waveform analyzer 14 is shown in FIG. 2 wherein the output of the detector 13 is applied to a trigger circuit 40. The trigger circuit 40 may be of a type commonly known as a Schmidt trigger which is operated when the output from the detector has a predetermined amplitude. The predetermined amplitude may be a voltage selected to correspond to desired output levels of the device 10 or may be a voltage determined by intergrating prior waveforms from the detector 13. When the trigger circuit 40 switches to the on or excited state, the first multivibrator 41 produces a first output pulse which has a width adjusted to have the predetermined duration. When the trigger circuit 40 returns to its initial or off state, a second monostable multivibrator 42 produces a second pulse adjusted to have the predetermined duration. These first and second pulses are applied over lines 15 and 16 to operate gates in counting circuit 17 to cumulatively count the number of cycles produced by the variable oscillator 11 during the first and second pulses.

Referring back to FIG. 1, there is shown logic circuitry 19 for generating a number indicating the bandwidth of the device 10. A control circuit 21 is triggered by the pulse on line 15 to supply a signal on line 25 to transfer the number in counter 17 to a register 20 after the counter 17 has counted the number of cycles produced by the oscillator when the pulse on line 15 is produced. This number corresponds to one-half the high frequency or $F_H/2$. The control circuit 21 is then stepped twice by a clock signal to apply two successive pulses over line 22 to an adder circuit 23. The adder circuit 23 adds the contents of registers 20 and 24 to each other twice. With the contents of the register 24 initially set to zero and after adding the contents of registers 20 and 24 to each other twice, the sum in both registers will be $F_H$. Next, the pulse on line 16 triggers the control circuit to apply a signal on line 30 to place a number from a complement circuit 31 into the register 24 after the low frequency or $F_L/2$ has been added to the counting circuit 17. The complement circuit 31 converts the output of the counter 17 into its complementary form, such as 9's complement for binary decimal coded numbers or 2's complement for binary numbers. Since the counter now reads the center frequency or one-half the sum of the high and low frequencies $(F_H/2 + F_L/2)$ the new number in the register 24 will correspond to $-(F_H/2 + F_L/2)$. The control circuit 21 then applies two more pulses to the adder circuit 23 to add the contents of the registers 20 and 24 to each other twice to produce a sum or remainder $(F_H - F_L)$ in each register 20 and 24. The remainder $F_H - F_L$ corresponds to the bandwidth of the device 10. The control circuit 21 may then be stepped to apply signals on lines 33, 34, 35 and 36 to transfer the stored data to a display, or other data handling equipment, and to reset the counter 17 and the registers 20 and 24.

The above-described embodiments of the invention are simply illustrative of the principles of the invention and many other embodiments may be devised without departing from the scope and spirit of the invention. For example, the logic circuitry 19 may be replaced by many other logic circuits for producing the remainder $F_H - F_L$. Also, the logic computations can be readily programmed and performed on a suitable general purpose computer.

What is claimed is:

1. A method of testing a frequency responsive device for the center frequency of response, comprising:
   applying a sweep frequency signal to the input of the device;
   sensing when the output of the device reaches a predetermined amplitude to produce a first pulse;
   sensing when the output falls below the predetermined amplitude to produce a second pulse; and
   cumulatively counting the cycles of signal for a predetermined duration in response to the first pulse and for the predetermined duration in response to the second pulse to determine the center frequency of response of the device.

2. A method of testing a frequency responsive device for bandwidth, comprising:
   applying a sweep frequency signal to the input of the device;
   sensing when the output of the device reaches a predetermined amplitude to produce a first pulse;
   counting the cycles of signal for a predetermined duration in response to the first pulse;
   sensing when the output falls below the predetermined amplitude to produce a second pulse;
   counting the cycles of signal for the predetermined duration in response to the second pulse; and
   determining a difference between the number of cycles counted in response to the first pulse and the number of cycles counted in response to the second pulse to determine the bandwidth of the device.

3. A method of testing a frequency responsive device for center frequency and for bandwidth comprising the steps of claim 2 and in addition the step of:
   cumulating the counts in response to the first and second pulses to determine the center frequency of response of the device.

4. An apparatus for testing a frequency responsive device for the center frequency of response comprising:
   a sweep frequency oscillator for applying a sweep frequency signal to the device under test;
   a waveform analyzer for sensing when the output of the device reaches a predetermined amplitude to produce a first pulse and for sensing when the output of the device drops below the predetermined amplitude to produce a second pulse; and
   means for cumulatively counting the cycles of signals produced by the sweep frequency oscillator for a predetermined duration in response to the first pulse and for the predetermined duration in response to the second pulse.

5. An apparatus for testing a frequency responsive device for bandwidth comprising:
   a sweep frequency oscillator for applying a sweep frequency signal to the device under test;
   a waveform analyzer for sensing when the output of the device reaches a predetermined amplitude to produce a first pulse and for sensing when the output of the device drops below the predetermined amplitude to produce a second pulse;
   means for counting the cycles of signals produced by the sweep frequency oscillator for a predetermined duration in response to the first pulse and for the predetermined duration in response to the second pulse; and
   means for determining a difference between the number of cycles counted in response to the first pulse and the number of cycles counted in response to the second pulse to indicate the bandwidth of the device.

6. An apparatus for testing a frequency responsive device for bandwidth and center frequency comprising the elements of claim 5, wherein the counting means cumulates the number of cycles counted in response to the first pulse and the number of cycles counted in response to the second pulse to indicate the bandwidth of the device.

7. An apparatus as defined in claim 6, wherein the determining means comprises:
   first and second registers, the first register being coupled to the counting means;
   a complement circuit coupling the second register to the counting means;
   an adder circuit connected to outputs and inputs of both the first and second registers; and control means connected to the first and second registers and the adder circuit for sequentially (1) placing the number of cycles counted by the counting means into the first register in response to the first pulse, (2) adding the contents of the first and second registers to each other twice, (3) placing the complement of the number of cycles counted by the counting means into the second register in response to the second pulse, and (4) adding the contents of the first and second registers to each other twice to indicate the bandwidth of the device.

* * * * *